United States Patent [19]

Harris et al.

[11] 4,314,104
[45] Feb. 2, 1982

[54] NARROW BAND VOICE MODULATOR SYSTEM

[75] Inventors: Richard W. Harris, Stockton; John F. Cleveland, Folsom, both of Calif.

[73] Assignee: VBC, Inc., Lodi, Calif.

[21] Appl. No.: 749,857

[22] Filed: Dec. 13, 1976

[51] Int. Cl.³ .............................................. G10L 1/00
[52] U.S. Cl. ........................................... 179/15.55 R
[58] Field of Search ............... 179/15.55 R, 15 BW, 179/15 FS, 1 SA, 107 FD

[56] References Cited

U.S. PATENT DOCUMENTS

| | | | |
|---|---|---|---|
| 1,836,824 | 12/1931 | Steinberg | 179/15.55 R |
| 1,948,973 | 2/1934 | Steinberg | 179/15.55 R |
| 2,014,081 | 9/1935 | Csepely | 179/15.55 R |
| 2,726,283 | 12/1955 | Di Toro | 179/15.55 R |
| 3,069,506 | 12/1962 | Hopner et al. | 179/15.55 R |
| 3,389,225 | 6/1968 | Myers | 179/15 BW |
| 3,914,554 | 10/1975 | Seidel | 179/15 BW |

OTHER PUBLICATIONS

J. M. Parkin, "Amplitude Modulator Type TM9897A", Marconi Instrumentation, vol. 13, No. 1, Apr. 1971, pp. 23-24.

*Primary Examiner*—Mark E. Nusbaum
*Assistant Examiner*—E. S. Kemeny
*Attorney, Agent, or Firm*—Townsend and Townsend

[57] ABSTRACT

A method and system for reducing the actual bandwidth required for the transmission of signals which are inherently time and frequency division multiplexed, e.g. human speech signals, input signals of the above type lying within a first fractional bandwidth portion are converted to equivalent signals lying within a second fractional bandwidth portion lying outside the first fractional bandwidth portion, and both the coverted equivalent signals and the input signals originally lying within the second fractional bandwidth portion are continuously applied to a transmitter device for communication over a suitable link to a receiving station, the equivalent signals received by the receiving station are reconverted to signals lying within the first fractional bandwidth portion and are continuously applied to a receiver device along with those received signal portions originally lying within the second fractional bandwidth portion, the step of converting is performed by modulating the input signals with a carrier signal to generate the equivalent signals lying within the second fractional bandwidth portion. The step of reconverting the equivalent received signals is similarly performed, for input signals having different average power levels in the first and second fractional bandwidth portions, the different average power levels are substantially equalized prior to transmission, and the average power level of such received signals is altered to substantially restore the original power level difference.

47 Claims, 11 Drawing Figures

NARROW BAND VOICE MODULATOR SYSTEM

BACKGROUND OF THE INVENTION

This invention relates to communications systems in which information is transmitted from a sending station to a receiving station in the form of electrical or electromagnetic information bearing signals over a communication link having a predetermined system frequency bandwidth. More particularly, this invention relates to methods and systems for reducing the actual bandwidth occupied by the information bearing signals to improve the flow of information or to reduce the actual bandwidth requirements of the communication link. Specifically, this invention relates to systems and methods for reducing the actual bandwidth requirement of that class of signals having inherent time division and frequency division multiplexing, such as human speech signals.

It has long been known that the primary intelligibility of human speech (defined as the speech information content as opposed to an individual speaker's identifiable characteristics, such as voice timber and the like) lies in the band from about 1000 to about 3000 HZ, and that human speech is naturally temporally divided into higher frequency components (the consonants occurring in the range from about 1500 to about 3000 HZ and lower frequency components (vowels) occurring in the range from about 0 to about 1500 HZ. Stated differently, human speech may be characterized as information bearing signals having inherent time division and frequency division multiplexing due to the serial nature of speech pronunciation: i.e. a vowel and a consonant cannot occur at the same time. It should be noted that the time division and frequency division multiplexing of human speech is not absolute, i.e. vowel sounds may have frequency portions lying above 1500 HZ while consonants may have frequency components lying below 1500 HZ. However, from a statistical point of view, if significant energy in a particular speech utterance exists below 1500 HZ then the probability of the existence of a very small amount of energy above 1500 HZ during the same time period is close to one. Conversely, if a high percentage of speech energy exists above 1500 HZ, there is a high probability that there will be very little energy below 1500 HZ for that same time period.

Efforts have been made in the past to exploit the above natural characteristics of human speech to reduce the actual bandwidth required to transmit such information from a sending station to a receiving station in order to (a) permit the use of a communication link having a bandwidth less than the normal bandwidth of 3000 HZ, or (b) permit more than one set of speech signals to be transmitted over the same communications link having the normal speech bandwidth of 3000 HZ. In an early system exemplified by the disclosure of U.S. Pat. No. 1,836,824 directed to a telephone communication system, parallel signal conduction paths are provided in the transmitting and receiving portion of a telephone apparatus, with each pair of signal paths having a first path for passing only signals lying in a relatively low frequency range of 250-2250 Hz and a second path having means for passing only higher frequency signals lying in the range from 1250-3250 Hz. Signals in this higher frequency range are converted to equivalent signals lying in the lower frequency pass range of the first path with the output of each signal path being coupled to a common transmitting or receiving unit. The first and second signal paths are operated in a mutually exclusive mode by a switching device which permits the input signal to be coupled to either the lower frequency signal path or the higher frequency signal path, depending on the amplitude of the input signals, it having been experimentally observed that vowel sounds statistically have a greater amplitude than consonant sounds. Systems of this type suffer from the disadvantage that the switching elements inject undesirable noise into the speech signals transmitted or received, which noise predominantly lies within the ordinary frequency band of the communications system, and further from the disadvantage that the switching from the normally active higher frequency signal path to the lower frequency signal path is exclusively dependent upon the amplitude of the speech input signals, so that the occurrence of a consonant sound at a relatively large amplitude causes such relatively high frequency signals to be coupled to the relatively low frequency signal path with resultant signal loss.

A later approach employing a more sophisticated method and system, and exemplified by U.S. Pat. No. 2,726,283, employs a switching device at the output end of parallel signal paths and additional decision making circuitry for measuring the fundamental pitch of the input speech signals to enable time-sharing of the period of the fundamental by causing the low frequency signals to be coupled through the mixer switch during the first half period of the fundamental and the down converted consonant equivalent signals to be coupled through the mixer switch to the output terminal during the second half period of the fundamental. This arrangement suffers from the disadvantage that inherently one-half of the speech signal is lost since the normal temporal separation of the vowel and consonant portions of the speech signal is not relied upon. In addition, this arrangment suffers from the noise injection problem noted above due to the controlled switching that also requires rather complex electrical circuitry which is subject to frequency drift and other distortion introducing characteristics. Further, the circuitry required to measure the fundamental period adds further cost and complexity to the entire system.

Efforts to date to provide a simple, economical method and system for accomplishing the objectives noted above with the signals having inherent time divisions and frequency division multiplexing have not met with success.

SUMMARY OF THE INVENTION

The invention comprises a method and system for reducing the actual bandwidth required for the intelligible transmission of speech signals or similar information bearing signals which are inherently time and frequency division multiplexed, which method and system are relatively inexpensive to implement and are highly reliable in performance.

The method comprises the steps of converting those input signals lying within a first fractional bandwidth portion of the input signals to equivalent signals lying within a second fractional bandwidth portion which lies outside the first fractional bandwidth portion; continuously transmitting both the converted equivalent signals and those input signals originally lying within the second fractional bandwidth portion to a receiving station; reconverting the equivalent signals received by the receiving station to signals lying within the first fractional bandwidth portion; and continuously applying the reconverted signal and those received signals originally lying within the second fractional bandwidth portion to a receiver device. Preferably, the step of converting those signals lying within the first fractional bandwidth portion is performed by modulating the input signals with a carrier signal to generate the equivalent signals lying within the second fractional band width portion. The step of reconverting the equivalent received signals to signals lying within the first fractional bandwidth portion is similarly performed by modulating the received signals with a carrier signal to produce resulting signals lying within the first fractional bandwidth portion. For those signals comprising human speech signals, the first and second fractional bandwidth portions each preferably comprises substantially one-half of the system frequency bandwidth which is nominally in the range from about 0–3000 Hz, with the first and second fractional bandwidth portions comprising the range from about 1500–3000 Hz and 0–1500 Hz, respectively. Further, for input signals having different average power levels in the first and second fractional bandwidth portions, the method further comprises the step of substantially equalizing the average power level of the input signals in the first and second fractional bandwidth portions prior to the step of transmitting, and altering the average power level of the received signals to substantially restore the original power level difference.

The system comprises sending station means including an input terminal means adapted to receive input signals having first portions lying predominantly within a first fractional portion of a system frequency bandwidth and second portions lying predominantly within a second fractional portion of the system frequency bandwidth; means coupled to the input terminal means for converting those input signals lying within the first fractional bandwidth portion to equivalent signals lying within the second fractional bandwidth portion; and means for continuously transmitting both the equivalent signals and those input signals originally lying within the second fractional bandwidth portion; a communication link means coupled to the sending station and receiving station means coupled to the communication link means, the receiving station means including means for reconverting the equivalent signals received at the receiving station to signals lying within the first fractional bandwidth portion, an output terminal means adapted to be coupled to a receiving device, and means for continuously coupling those signals generated by the reconverting means and those received signals originally lying within the second fractional bandwidth portion to the output terminal. The converting means and the reconverting means preferably each includes a balanced modulator and means coupled to the balanced modulator for generating a carrier signal train. For signals having different average power levels in the first and second fractional bandwidth portions, the sending station means preferably includes means for substantially equalizing the average power level of the input signals in the first and second fractional band width portions, and the receiving station further includes means for altering the average power level for the received signals to substantially restore the original power level difference. Both the equalizing means and the altering means preferably each comprises a frequency selective signal transfer device for reducing the amplitude of those signals lying within that fractional band width portion in which the average power level is higher.

For a fuller understanding of the nature and advantages of the invention, reference should be had to the ensuing detailed description taken in conjunction with the accompanying drawings.

DESCRIPTION OF THE PREFERRED EMBODIMENTS

Figure 1:
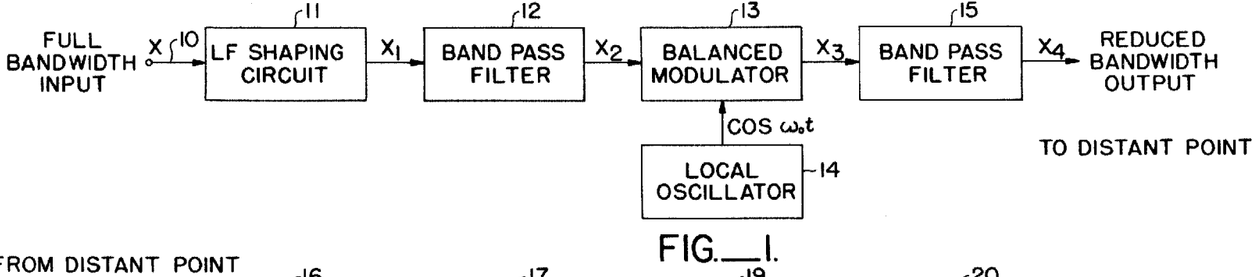
FIG. 1 is a block diagram of a sending station according to the invention.
Figure 2:
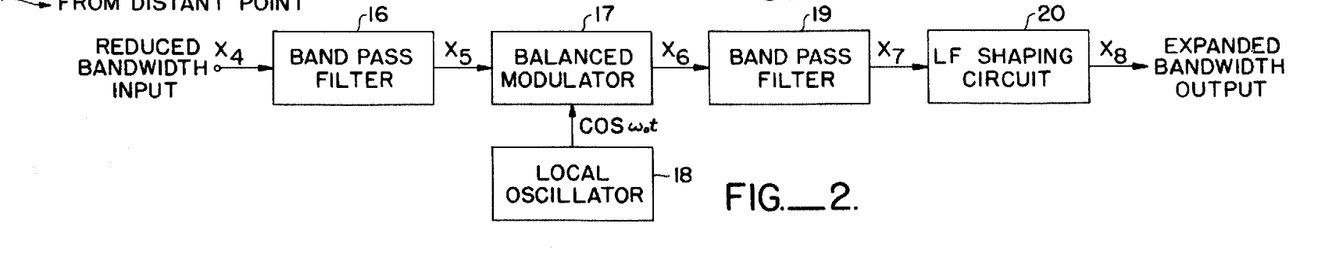
FIG. 2 is a block diagram of a receiving station according to the invention.

Turning now to the drawings, FIGS. 1 and 2 illustrate in block diagram form a preferred embodiment of a sending station and a receiving station, respectively, embodying the invention.

With reference to FIG. 1, an input terminal 10 is provided for receiving speech input signals generated by any suitable transducing device, such as a telephone transmitter, a microphone or the like. Input terminal 10 is coupled to the input of a low frequency shaping circuit 11 having the amplitude vs. frequency response characteristics shown in FIG. 3B, described below, and which functions to adjust the relative power levels of the signals lying within first and second fractional portions of the system frequency bandwidth. It should be noted that, in those applications in which the average power level of the input signals is substantially uniform throughout the entire spectrum of the system bandwidth, low frequency shaping circuit 11 may be omitted and input terminal 10 may be coupled directly to the input of a band pass filter 12. The function of band pass filter 12 in either arrangement is to limit the spectrum of the input signals prior to a frequency conversion described below to substantially the system frequency band, and in the preferred embodiment band pass filter 12 is constructed to have a nominal upper cut off frequency of about 2750 Hz.

The output of filter 12 is coupled to the signal input of a balanced modulator 13, the carrier input of which is coupled a carrier signal of appropriate frequency from a local oscillator 14. In the system of FIG. 1, local oscillator 14 generates a carrier signal train of 3000 Hz. The output of balanced modulator 13 is coupled through a second band pass filter 15 which functions to strongly attenuate or remove all signals lying outside a predetermined fractional portion of the system frequency band. In the embodiment of FIG. 1, band pass filter 15 has a frequency pass band from about 250 to about 1500 Hz. The output of band pass filter 15 is coupled to a communication link, which may comprise a telephone hybrid coupled to a trunk line, a microwave transmitter and link, an FM transmitter or the like.

In operation, the input signals, after modification by shaping circuit 11 and band pass filter 12, are applied to balanced modulator 13 in which those signal portions lying in the upper half of the entire band pass frequency range are down converted to equivalent signals lying in the lower half of the frequency band pass range, while the signals originally lying within the lower half of the band pass frequency range are merely transferred through balanced modulator 13 without frequency conversion. The lower frequency signals transferred through balanced modulator 13 suffer a predetermined attenuation which depends upon the feed through loss K of balanced modulator 13. As will be appreciated by those skilled in the art, the output of balanced modulator 13 contains both sum and difference products lying outside the lower half of the system frequency pass band; however, these components are strongly attenuated or removed by band pass filter 15 which has a high frequency cut off of about 1500 Hz. Ideally, to minimize selective attenuation of the signals traveling over the communication link through a receiving station such as the receiving station of FIG. 2, the power level of the down converted equivalent signal should be substantially equal to the power level of the signals fed through modulator 13. This may be accomplished by selection of the feed through constant K of balanced modulator 13 and the amplitude vs. frequency characteristics of shaping circuit 11.

FIG. 2 illustrates a receiving station embodying the invention which is similar in construction to the sending station of FIG. 1. With reference to FIG. 2, the reduced bandwidth information signals received from the sending station are first coupled through a band pass filter 16 having an amplitude vs. frequency response characteristic substantially the same as band pass filter 15 of the sending station of FIG. 1, and the thus filtered received signals are applied to the signal input of a balanced modulator 17. Balanced modulator 17 is also provided with a carrier signal train by a local oscillator 18, the frequency of the carrier signal train provided by oscillator 18 being the same as that provided by local oscillator 14 of the sending station. The modulator 17 output signals are coupled through a band pass filter 19, whose amplitude vs. frequency response is substantially the same as filter 12, and to the input of the frequency selective shaping circuit 20. The output of frequency selective shaping circuit 20 is then coupled to any one of a number of appropriate follow on devices, such as a telephone receiver, an audio amplifier, or the like.

In operation, the reduced bandwidth signal coupled to the receiving station 2 is filtered by band pass filter 16 to strongly attenuate or remove any frequency components lying outside the lower half of the system pass band and the filtered signal is applied to the balanced modulator 17 in which those equivalent signals corresponding to the original signals lying in the upper half of the system frequency band are up converted to this upper half portion, while those received signals originally lying within the lower half portion of the system frequency band are fed through balanced modulator 17 with attenuation loss K. The modulator 17 output signals are filtered by band pass filter 19 to block those frequency components lying outside the system frequency pass band and are applied to frequency selective shaping circuit 20 which selectively amplifies low frequency signals to substantially restore the original power spectrum distribution.

Critical to the proper operation of the invention is the frequency response of shaping circuits 11, 20 and the feed through constant K of balanced modulators 13, 17. It can be shown that potential distortion products exist which, unless compensated for, will render the original speech input signals unintelligible after their reception and reconverting by the receiving station in FIG. 2. To reduce these potential distortion products to an acceptable level (defined as one in which the received signals convey the intelligence originally presented), the product of the signal transfer characteristic $H_1$ of the shaping circuit 11 and the feed through constant K of modulator 13 should be such that the natural amplitude imbalance between the lower frequency portion of the input signals and the higher frequency portion of the input signals is substantially equalized before transmission over the communication link; while the feed through constant K of the balanced modulator 17 and the frequency response of shaping circuit 20 should preferably be substantially equal to those same characteristics of modulator 13 and shaping circuit 11.

Figure 3A:
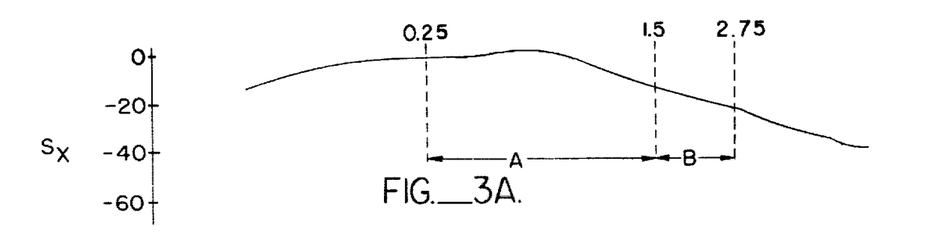
FIGS. 3A–D are amplitude vs. frequency response curves for various components of the FIG. 1 and FIG. 2 stations.

FIGS. 3A-D illustrate suitable frequency response characteristics for the elements of the system comprising FIGS. 1 and 2. FIG. 3A illustrates a typical long term average energy spectral density for speech $S_x$, which can be seen to be composed of a relatively high amplitude portion in the range from about 0-1000 Hz corresponding to the voiced (vowel) portion of human speech and a relatively low amplitude portion in the range from about 1000 Hz to about 8000 Hz corresponding to the unvoiced (consonant) portion of human speech. In the preferred embodiment, the fractional bandwidth dividing line has been chosen at 1500 Hz which allows a spectral division and a subsequent division by a factor of 2 with a system having a frequency pass band of 3000 Hz. It should be noted that other numerical values may be chosen for the dividing line, depending primarily on the expected average energy spectral density of the input signals for which the system is designed. Further, a dead band may be provided, if desired, between the upper and lower fractional bandwidth portions so that the upper frequency limit of the lower bandwidth portion is lower in numerical value than the lower frequency limit of the upper bandwidth portion.

Figure 3B:
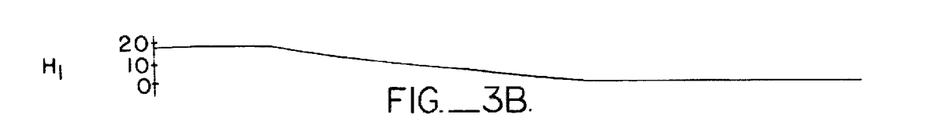
Figure 3C:
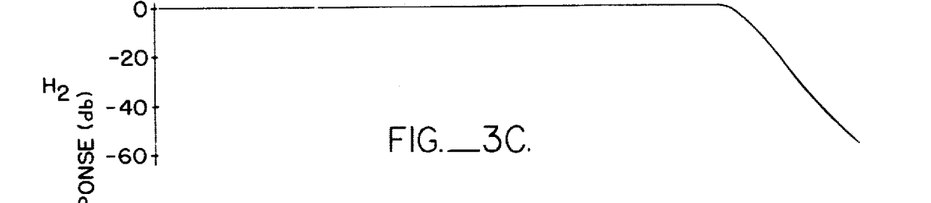
Figure 3D:
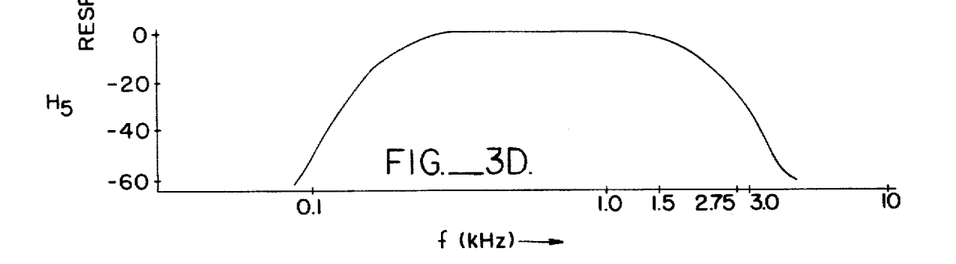

FIG. 3B shows the frequency response characteristic of both frequency shaping circuit 11 and frequency shaping circuit 20 and is seen to exhibit a region of substantially constant attenuation (or high amplification) extending from 0 to about 100 Hz, a region of substantially linear progressive attenuation extending from about 100 to about 700 Hz and a remaining range of substantially constant maximum attenuation (or minimum amplification) extending beyond the upper cut off of the system frequency pass band. FIG. 3C shows the frequency response of filters 12 and 19 which is substantially constant in gain from 0 to about 2750 Hz, while FIG. 3D shows the frequency response of band pass filters 15, 16 which is substantially constant in gain over the range from about 250 to about 1500 Hz, i.e. the reduced bandwidth afforded by the invention.

As noted above, the frequency response of shaping circuits 11, 20 and the feed through constant K of balanced modulators 13, 17 is critical to the proper operation of the invention. It can be shown that the signal $x_4$ present at the output of filter 15, in response to the application of human speech signals in a period W to input terminal 10 is:

$$x_4 = D_v K H_1 \cos \omega_v t + (Du)/2 \cos (\omega_o - \omega_u)t$$

where $H_5 = 1$ for $f = f_v$ and $f = f_o - f_u$ when $0.25 < f_v < 1.5$ K Hz
$0.25 < f_o - f_u < 1.5$ K Hz where $D_v$ is the amplitude of the voiced component,
$D_u$ is the amplitude of the unvoiced component, K is the feed through constant of modulator 13, $H_1$ is the amplitude spectral transfer function of low frequency shaping circuit 11, W is the period of one voiced-unvoiced speech interval, $\omega_v$ and $\omega_u$ are the angular frequencies of the voiced and unvoiced portions of the input speech signals, $\omega_0$ is the angular carrier frequency, $f_v$, $f_u$ and $f_o$ are the respective frequencies of the voiced portion, the unvoiced portion and the carrier, and the modulator 13 has a gain function of unity for the sum and difference components at the output thereof, infinite loss for the carrier feed through and K loss $<<1$ for the input speech signals fed therethrough.

The transmitted signal is composed of the inverted (lower side band) unvoiced (consonant) sounds and the feed through non-inverted (vowel) sounds. Since the voiced and unvoiced sounds are temporally separated, there is no theoretical distortion in the transmitted signal. In actuality, speech signals do exhibit a more gradual temporal transition from voiced to unvoiced sounds; however, the temporal separation is sufficiently pronounced so that sufficient spectral overlap does not occur.

Depending on the product of K $H_1$, the voiced signal is attenuated rather substantially so that the natural voiced to unvoiced level imbalance of 15-25 db is changed to approximately 0 db for transmission. Thus, the voiced and unvoiced signals share nearly equally the transmitter power or the line losses, depending on the nature of the communication link.

Similarly, the signals present at the output of low frequency shaping circuit 20 of FIG. 2 in response to the application to the input of filter 16 of a signal as defined by the above equation is $$x_8 = D_v K^2 H_1 H_{10} \cos \omega_v t + \frac{D_v K H_1}{2} \cos (\omega_o - \omega_v)t + \frac{D_u}{4} \cos \omega_u t + \frac{D_u K H_{10}}{2} \cos (\omega_o - \omega_u)t$$

where $H_{10}$ is the amplitude spectral transfer function of low frequency shaping circuit 20 and the remaining symbols are as defined above.

Those terms with frequency components $\omega_o - \omega_v$ constitute distortion terms which cannot be entirely eliminated, but which can be reduced to an acceptable level. For example, in a system in which the transfer functions $H_1$ and $H_{10}$ are as shown in FIG. 3B, the distortion term in the signals present at the output of low frequency shaping circuit 20 are limited to those unvoiced speech components from about 2.8 to 3.0 K Hz. Most human voices have very little energy at these frequencies and the distortion actually present at the output of circuit 20 has been found to be insignificant.

Figure 5:
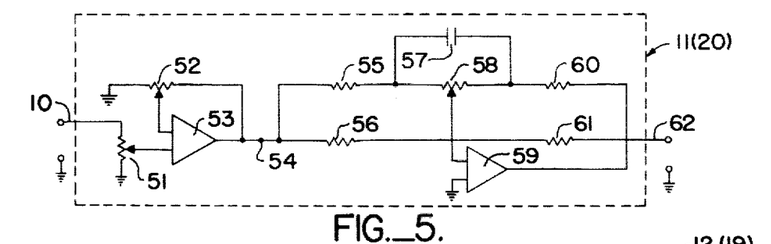
FIGS. 5–8 are circuit schematics of various elements in the preferred embodiment of the invention.

FIGS. 5-8 illustrate the actual circuit components of a specific embodiment of the invention. With reference to FIG. 5, which illustrates the structure of the low frequency shaping circuits 11, 20, elements 51-53 form an active gain or attenuation circuit for adjusting the level of the incoming speech signal to the appropriate value for the following stages, with variable resistance 51 providing attenuation control and variable resistance 52 controlling the gain. At point 54, the level adjusted speech signal is presented to the input of a single stage low frequency shaping circuit comprising elements 55-61. In the preferred embodiment, R56=R61, R55=R60, R58>>R56 and R56>>R55 by a factor of ten. With these circuit parameters, the gain increases linearly for frequencies below $\frac{1}{2}\pi$R55.C57 (termed fl$_1$). The maximum amount of voltage gain between output terminal 62 and point 54 is approximately equal to R56÷R55, which occurs at a frequency termed fl$_2$. The parametric values are such that fl$_1$ and fl$_2$ are 700 Hz and 70 Hz, respectively, for shaping circuit 11, and 700 Hz and 7 Hz, respectively, for shaping circuit 20. For shaping circuit 20, there is a maximum gain of approximately 30-40 db beginning at frequencies below 700 Hz.

Figure 6:
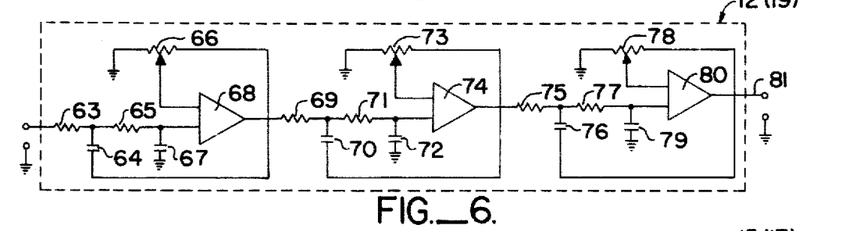

FIG. 6 shows the circuit detail of filters 12, 19 which comprises a Chebyshef filter with 0.1 db ripple in-band and 6 poles. The circuit is constructed to have an in-band gain of 8.3 (which is the ratio of the output voltage to input voltage) with a 3 db break point fc=2.75 K Hz.

Figure 7:
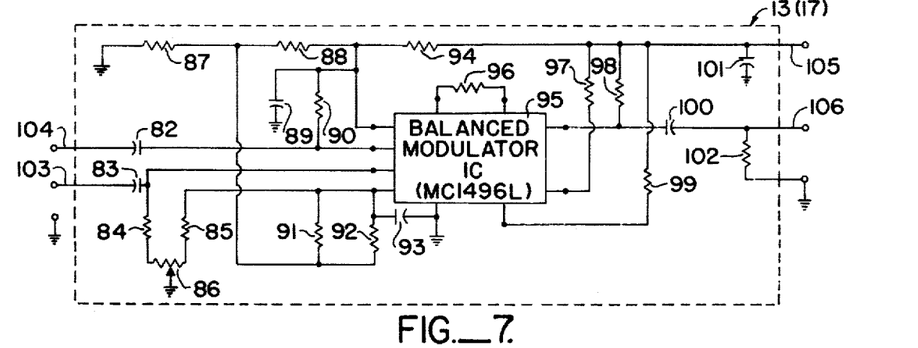

FIG. 7 shows the circuitry of balance modulators 13 and 17 which utilizes a type MC 1496 L integrated circuit manufactured by Motorola, Inc. Balanced modulation is provided by resistors R84, R85 and R86 which permit the carrier feed through to be nulled out. The carrier signal from local oscillator 14 (FIG. 1) or 18 (FIG. 2) is coupled to input terminal 104, the speech signals are coupled to input terminal 103, the supply voltage is coupled to terminal 105 and terminal 106 comprises the output terminal of the device. The carrier suppression should be at least 40 db, and the in-band feed through K approximately equal to 0.1 for the modulator. Suggested rms voltage levels for the carrier input and signal input are 60 mv and 300 mv, respectively.

Figure 8:
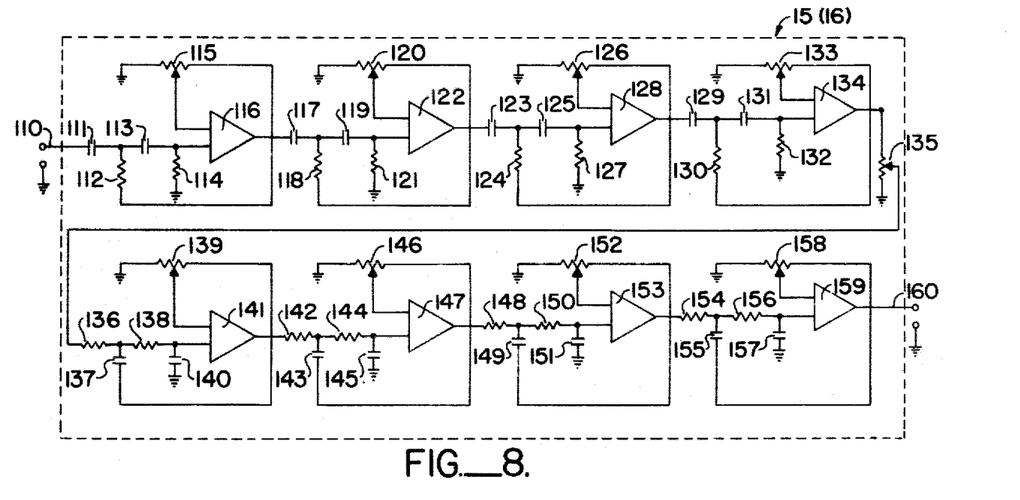

FIG. 8 illustrates the circuit components of filters 15 and 16, each of which comprises a transitional Butterworth Thompson type filter with 8 poles for the upper 3 db cut-off frequency and 8 poles for the lower 3 db cut-off frequency. Variable resistor R135 provides a level adjustment primarily to attenuate the gain in the first four sections of the filter. This construction has been found to provide a good compromise between amplitude and phase responses necessary to produce speech signals having a natural voice quality (i.e. signals not possessing a "machine like" characteristic).

Figure 4:
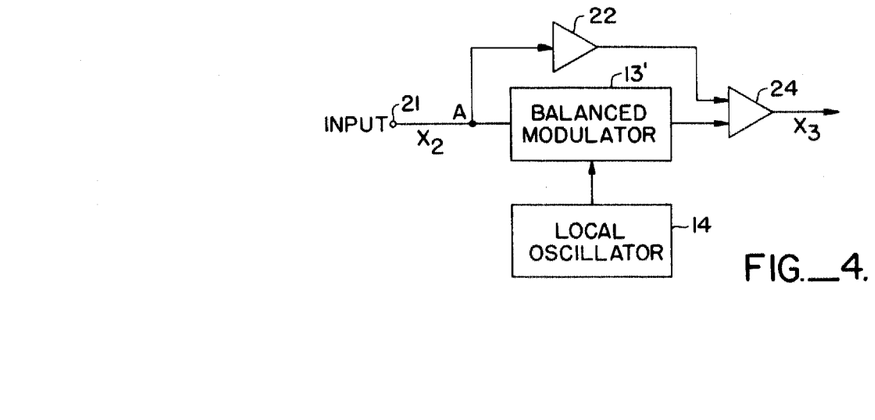
FIG. 4 is a block diagram of an alternate embodiment of a sending station of FIG. 1 or a receiving station of FIG. 2.

FIG. 4 illustrates an alternate arrangement for use in either the sending station of FIG. 1 or the receiving station of FIG. 2 and which may be used to replace the balanced modulator and local oscillator. As seen in FIG. 4, an input terminal 21 which is coupled to the output of either filter 12 (FIG. 1) or filter 16 (FIG. 2) furnishes signals to the signal input of a balanced modulator 13' and also to an amplifier 22. Balanced modulator 13' has a feed through constant K chosen to be much less than unity, preferably in the range from 0.01 to 0.001, so that the portion of the input signal lying below 1500 Hz is substantially completely rejected by modulator 13'. In this arrangement, those signals output from balanced modulator 13' lying in the range from 0-1500 Hz contain only information formerly found in that portion of the input signal lying in the range from 1500-3000 Hz and are coupled to one input of summing amplifier 24. Amplifier 22 is chosen to be frequency selective so as to amplify only that portion of the input signal lying in the range from 0-1500 Hz and the frequency response characteristics of amplifier 22 in this lower half of the system frequency band are selected in such a manner as to provide signals to summing amplifier 24 whose average power level is substantially equal to that of the signals supplied to amplifier 24 by modulator 13'. The signals from summing amplifier 24 are then coupled either to band pass filter 15 (FIG. 1) or filter 19 (FIG. 2).

The above described invention is adaptable for use in many types of signal communication systems. For example, the invention may be incorporated into Citizens Band or amateur radio transceivers, telephone hand sets, and can be used beneficially in virtually all types of voice modulation systems, such as amplitude, double side band, single side band, vestigial side band and frequency modulation systems. It is noted that, when employed in a frequency modulation system, the invention may be used to either reduce transmission bandwidth or provide improved signal to noise ratio (since the FM carrier may be deviated twice as far with the invention due to the fact that the reduced band width signal is one-half the band width of the normal base band speech signal.)

While the above provides a full and complete disclosure of the preferred embodiments of the invention, various modifications, alternate constructions and equivalents may be employed without departing from the true spirit and scope of the invention. Therefore the above description and illustrations should not be construed as limiting the scope of the invention which is defined by the appended claims.

What is claimed is:

1. A method of transmitting information bearing input signals from a sending station to a receiving station via a communication link having a predetermined system frequency band width, said input signals having first portions lying predominantly within a first fractional portion of said system frequency band width and second portions lying predominantly within a second fractional portion of said system frequency band width, said first and second signal portions being substantially temporally spaced and said second fractional band width portion lying outside said first fractional bandwidth portion, said method comprising the steps of:
   (a) passing said input signals through a first filtering means to selectively attenuate said first portions;
   (b) processing the signals resulting from step (a) to produce first equivalent signals having first frequency spectrum components lying predominantly within said second fractional bandwidth portion, said first frequency spectrum components corresponding to said first and second portions of said input signals;
   (c) continuously coupling the signals resulting from step (b) to a transmitting device;
   (d) transmitting the signals coupled to said transmitting device to said receiving station;
   (e) processing the received signals from step (d) to produce second equivalent signals having second frequency spectrum components lying within said second fractional bandwidth portion and corresponding to said second portions of said input signals, third frequency spectrum components lying within said first and second fractional bandwidth portions and corresponding to said first portions of said input signals, and fourth frequency spectrum components lying within said first fractional bandwidth portion and representing redundant signal information; and
   (f) continuously coupling the signals resulting from step (e) to a receiver device.

2. The method of claim 1 wherein said step (b) of processing includes the step (i) of modulating the signals resulting from step (a) with a carrier signal to produce said first equivalent signals.

3. The method of claim 1 wherein said first and second fractional bandwidth portions each comprises substantially one half of said system frequency bandwidth.

4. The method of claim 1 wherein said step (e) of processing is followed by the additional step of passing said second equivalent signals through a third filtering means to selectively boost said second frequency spectrum components and selectively attenuate said fourth frequency spectrum components.

5. The method of claim 1 wherein said step (e) of processing includes the step (ii) of modulating said received signals with a carrier signal to produce said second equivalent signals.

6. The method of claim 1 wherein said system frequency bandwidth is in the range from about 0 to about 3000 HZ, said first fractional bandwidth portion is in the range from about 1500 to about 3000 HZ and said second fractional bandwidth portion is in the range from about 0 to about 1500 HZ.

7. The method of claim 1 wherein those input signals lying within said first fractional bandwidth portion have an average power level different from those input signals lying within said second fractional bandwidth portion, and wherein said step (b) of processing is preceded by the step (ii) of substantially equalizing the average power level of said input signals in said first and second bandwidth portions.

8. The method of claim 7 wherein said average power level of said input signals lying within said second fractional bandwidth portion is greater than the average power level of said input signals lying within said first fractional bandwidth portion and wherein said step (ii) includes the step of reducing the average power level of said input signals lying within said second fractional bandwidth portion.

9. The method of claim 7 further including the step of (g) selectively altering the average power level of said signals resulting from said step (e) of processing to substantially restore the original power level difference.

10. The method of claim 9 wherein said step (g) of altering includes the step of selectively amplifying those signals resulting from said step (f) of processing and which lie within said second fractional bandwidth portion.

11. A communications system for transmitting information bearing input signals from a first location to a second location via a communication link having a predetermined system frequency bandwidth, said input signals having first portions lying predominantly within a first fractional portion of said system frequency bandwidth and second portions lying predominantly within a second fractional portion of said system frequency bandwidth, said first and second signal portions being substantially temporally spaced and said second fractional bandwidth portion lying outside said first fractional bandwidth portion, said system comprising:
   sending station means including:
      input terminal means adapted to receive said input signals;
      first filter means coupled to said input terminal means for selectively attenuating said first portions;
      first processing means coupled to said first filter means for generating first equivalent signals having first frequency spectrum components corresponding to said first and second portions of said input signals and lying predominantly within said second fractional bandwidth portion;

transmitting means; and means for continuously coupling said first equivalent signals to said transmitting means;

communication link means coupled to said transmitting means; and receiving station means having an input terminal means coupled to said communication link means, said receiving station means including:

second processing means coupled to said receiving station input terminal means for generating second frequency spectrum components lying within said second fractional bandwidth portion and corresponding to said second portions of said input signals, third frequency spectrum components lying within said first and second fractional bandwidth portions and corresponding to said first portions of said input signals, and fourth frequency spectrum components lying within said first fractional bandwidth portion and representing redundant signal information; and output terminal means coupled to said processing means for manifesting the signals output therefrom.

12. The combination of claim 11 wherein said first processing means includes balanced modulator means coupled to said first filter means and means coupled to said balanced modulator means for generating a carrier signal.

13. The combination of claim 11 wherein said first and second fractional bandwidth portions each comprises substantially one-half of said system frequency bandwidth.

14. The combination of claim 11 wherein said receiving station means includes third filter means coupled to said second processing means for selectively boosting said second frequency spectrum components and selectively attenuating said fourth frequency spectrum components.

15. The combination of claim 11 wherein said second processing means includes balanced modulator means and means coupled to said balanced modulator means for generating a carrier signal.

16. The combination of claim 11 wherein said system frequency bandwidth is in the range from about 0 to about 3000 HZ, said first fractional bandwidth portion is in the range from about 1500 to about 3000 HZ and said second fractional bandwidth portion is in the range from about 0 to about 1500 HZ.

17. The combination of claim 11 wherein those input signals lying within said first fractional bandwidth portion have an average power level different from those input signals lying within said second fractional bandwidth portion, and wherein said sending station means further includes means for substantially equalizing the average power level of said input signals in said first and second fractional bandwidth portions.

18. The combination of claim 17 wherein said average power level of said input signals lying within said second fractional bandwidth portion is greater than the average power level of said input signals lying within said first fractional bandwidth portion, and wherein said means for substantially equalizing includes means for reducing the average power level of said input signals lying within said second fractional bandwidth portion.

19. The combination of claim 18 wherein said means for reducing comprises a frequency selective signal transfer device operable in said second fractional bandwidth portion.

20. The combination of claim 17 wherein said second processing means further includes means for selectively altering the average power level of the signals applied thereto to substantially restore the original average power level difference.

21. The combination of claim 20 wherein said altering means comprises a frequency selective signal transfer device for selectively amplifying those signals applied thereto which lie within said second fractional bandwidth portion.

22. A signal processing apparatus for reducing the frequency bandwidth of input signals to be transmitted from a sending station to a receiving station via a communication link having a preselected system frequency bandwidth, said input signals having first portions lying predominantly within a first fractional portion of said system frequency bandwidth and second portions lying predominantly within a second fractional portion of said system frequency bandwidth, said first and second signal portions being substantially temporally spaced and said second fractional bandwidth portion lying outside said first fractional bandwidth portion, said apparatus comprising:

input terminal means for receiving said input signals;

output terminal means adapted to be coupled to a transmitter;

first filter means coupled to said input terminal means for selectively attenuating said first portions;

first processing means coupled solely to said first filter means for generating first equivalent signals having first frequency spectrum components corresponding to said first and second portions of said input signals and lying predominantly within said second fractional bandwidth portion; and means for continuously coupling said first equivalent signals to said output terminal means.

23. The combination of claim 22 wherein said processing means comprises a balanced modulator means and oscillator means coupled to said balanced modulator means for generating a carrier signal.

24. The combination of claim 23 wherein said balanced modulator means includes means for coupling the signals applied thereto which originally lie within said second fractional bandwidth portion therethrough with predetermined attenuation.

25. The combination of claim 11 wherein said first processing means includes means for generating first equivalent signals having additional frequency spectrum components lying within said first fractional bandwidth portion, and wherein said receiving station means includes second filter means coupled between said receiving station input terminal means and said processing means for selectively attenuating said additional frequency spectrum components.

26. The method of claim 1 wherein said step (b) of processing includes the step of producing first equivalent signals having second frequency spectrum components lying within said first fractional bandwidth portion, and wherein said step (e) of processing is preceeded by the step of passing the received signals through a second filtering means to selectively attenuate said second frequency spectrum components.

27. The combination of claim 23 wherein said processing means further includes an amplifier coupled to said first filter means in parallel with said balanced modulator means, and wherein said coupling means comprises a summing amplifier having a pair of input terminals coupled to said balanced modulator means and said amplifier and an output terminal coupled to said output terminal means.

28. The method of claim 2 wherein said step (b) of processing further includes the step (iii) of passing the signals resulting from step (i) of modulating through a fourth filtering means to selectively attenuate those signal portions lying within said first fractional system frequency bandwidth portion.

29. The combination of claim 23 wherein said processing means further includes second filter means coupled to the output of said balanced modulator means for selectively attenuating said second frequency spectrum components.

30. The combination of claim 22 wherein those input signals lying within said first fractional bandwidth portion have an average power level different from those input signals lying within said second fractional bandwidth portion, and wherein said apparatus further includes means coupled to said input terminal means for substantially equalizing the average power level of said input signals in said first and second fractional bandwidth portions.

31. The combination of claim 30 wherein said average power level of said input signals lying within said second fractional bandwidth portion is greater than the average power level of said input signals lying within said first fractional bandwidth portion, and wherein said means for substantially equalizing includes means for reducing the average power level of said input signals lying within said second fractional bandwidth portion.

32. The combination of claim 31 wherein said means for reducing comprises a frequency selective signal transfer device operable in said second fractional bandwidth portion.

33. A signal processing apparatus for expanding compressed information signals derived from original input signals at a sending station and received over a communication link having a preselected system frequency bandwidth, said original input signals having first portions lying predominantly within a first fractional portion of said system frequency bandwith and second portions lying predominantly within a second fractional portion of said system frequency bandwidth, said first and second signal portions being substantially temporally spaced and said second fractional bandwidth portion lying outside said first fractional bandwidth portion, said compressed information signals having first frequency spectrum components corresponding to said first and second portions of said input signals and lying predominantly within said second fractional bandwidth portion, said apparatus comprising:
  processing means for generating second frequency spectrum components lying within said second fractional bandwidth portion and corresponding to said second portions of said input signals, third frequency spectrum components lying within said first and second fractional bandwidth portions and corresponding to said first portions of said input signals, and fourth frequency spectrum components lying within said first fractional bandwidth portion and representing redundant signal information;
  filter means coupled to said processing means for selectively boosting said second frequency spectrum components and selectively attenuating said fourth frequency spectrum components; and
  output terminal means continuously coupled to said second filter means for manifesting the signals output therefrom.

34. The combination of claim 33 wherein said first and second fractional bandwidth portions each comprises substantially one-half of said system frequency bandwidth.

35. The combination of claim 33 wherein said compressed information signals include additional frequency spectrum components lying within said first fractional bandwidth portion, and wherein said apparatus further includes additional filter means coupled to said processing means for selectively attentuating said additional frequency spectrum components.

36. The combination of claim 33 wherein said processing means includes balanced modulator means and means coupled to said balanced modulator means for generating a carrier signal.

37. The combination of claim 33 wherin said system frequency bandwidth is in the range of from about 0 to about 3000 Hz, said first fractional bandwidth portion is in the range from about 1500 to about 3000 Hz, and said second fractional bandwidth portion is in the range from about 0 to about 1500 Hz.

38. The combination of claim 33 wherein said compressed information signals are derived from input signals having substantially equalized average power levels for said first and second portions, and wherein said filter means further includes means for selectively altering the average power level of the signal supplied thereto to substantially restore an original average power level difference between said first and second portions of said input signals.

39. The combination of claim 38 wherein said altering means comprises a frequency selective signal transfer device for selectively amplifying those signals applied thereto which lie within said fractional bandwidth portion.

40. The combination of claim 33 wherein said processing means comrises a balanced modulator means and oscillator means coupled to said balanced modulator means for generating a carrier signal train.

41. The combination of claim 40 wherein said balanced modulator means includes means for coupling the signals applied thereto which originally lie within said second fractional bandwidth portion therethrough with predetermined attenuation.

42. The combination of claim 40 wherein said processing means further includes an amplifier coupled in parallel with said balanced modulator means, and a summing amplifier having a pair of input terminals coupled to said balanced modulator means and said amplifier and an output terminal coupled to said filter means.

43. The combination of claim 12 wherein said first processing means further includes fourth filter means coupled to the output of said balanced modulator means for selectively attenuating said second frequency spectrum components.

44. The method of claim 2 wherein said step (i) of modulating the signals resulting from step (a) includes the step of attenuating the modulated signals by a predetermined amount.

45. The method of claim 5 wherein said step (ii) of modulating said received signals includes the step of attenuating the modulated signals by a predetermined amount.

46. The combination of claim 12 wherein said balanced modulator means includes means for coupling the signals applied thereto which originally lie within said second fractional bandwidth portion therethrough with predetermined attenuation.

47. The combination of claim 15 wherein said modulator means includes for coupling the signals applied thereto which originally lie within said second fractional bandwidth portion therethrough with predetermined attenuation.

* * * * *